United States Patent [19]

Monahan

[11] Patent Number: 4,549,078
[45] Date of Patent: Oct. 22, 1985

[54] AUTOMATIC TRACKING SYSTEM WITH INFRARED AND ULTRAVIOLET DETECTION

[76] Inventor: Daniel E. Monahan, 2200 Woodlawn St., Kannapolis, N.C. 28081

[21] Appl. No.: 542,932

[22] Filed: Oct. 18, 1983

Related U.S. Application Data

[60] Continuation-in-part of Ser. No. 348,691, Feb. 16, 1982, abandoned, which is a division of Ser. No. 178,513, Aug. 15, 1980, Pat. No. 4,318,890, which is a division of Ser. No. 948,061, Oct. 2, 1978, Pat. No. 4,233,127.

[51] Int. Cl.⁴ ................................................. G01J 1/20
[52] U.S. Cl. ................................. 250/203 R; 126/425
[58] Field of Search ...................... 250/203, 208, 209; 126/425

[56] References Cited

U.S. PATENT DOCUMENTS

4,086,485 4/1978 Kaplow et al. .................. 250/203 R
4,424,801 1/1984 Mori ..................................... 126/425

Primary Examiner—David C. Nelms
Attorney, Agent, or Firm—Ralph H. Dougherty

[57] ABSTRACT

An automatic tracking system for tracking the sun on a path across the sky, comprising a reflector, a pre-programmed, automatic timed drive mechanism connected to the reflector for driving it on a given path, both ultraviolet and infrared sensors positioned on the reflector, means for comparing the amount of light detected by opposing sensors, and means for tilting the reflector about a horizontal and a vertical axis until the amount of light detected by each pair of sensors is equalized.

4 Claims, 26 Drawing Figures

AUTOMATIC TRACKING SYSTEM WITH INFRARED AND ULTRAVIOLET DETECTION

REFERENCE TO RELATED APPLICATIONS

This application is a continuation-in-part of application Ser. No. 348,691, filed Feb. 16, 1982, now abandoned, which is a division of application Ser. No. 178,513, filed Aug. 15, 1980, now U.S. Pat. No. 4,318,890, which is a division of application of Ser. No. 948,061, filed Oct. 2, 1978, now U.S. Pat. No. 4,233,127.

BACKGROUND OF THE INVENTION

This invention relates to a tracking system for tracking the sun on its path across the sky. The invention is particularly useful in the generation of hydrogen and oxygen from water using solar energy. Solar energy can be converted into potential energy in the form of hydrogen and oxygen which may be in the liquid or gaseous state, or as a solid compound such as a metallic hydride. The uses of liquid oxygen are well known. Since demands on conventional non-replaceable fossil fuels have increased drastically over the recent decade threatening the world supply of these natural resources, and the cost of generation of electric and nuclear power have both increased drastically, it has become clear that a new fuel is needed. Hydrogen is readily available in water and fills this need. There are presently available engines and heating and power plants which can run on hydrogen.

In prior art devices, such as that taught in U.S. Pat. No. 4,030,890, solar energy (sunlight) is converted into thermal energy (heat) through mechanical means and with attendant energy losses. This thermal energy is then transferred, with attendant energy losses, through metallic interfaces to the reactant (water) until sufficient thermal energy has been transferred to the water to bring about its thermal decomposition. Such devices have several major disadvantages. They rely solely on thermal energy to promote dissociation. Thus, they do not take advantage of the ability of certain frequencies of the light spectrum, primarily the near ultraviolet wave ranges to fracture the molecular bonds in the molecules of water vapor, causing direct dissociation through the medium of wave form irradiation. This phenomenon is known as photolysis, of the photolytic effect of the ultra-violet radiation in sunlight upon the molecular bonds in water vapor molecules. When combined with the known effects of high thermal energy levels upon water vapor molecules to cause direct thermal decomposition of the water into elemental and molecular hydrogen and oxygen, the photolytic effect permits a given rate of decomposition to take place at lower temperatures, and with greater efficiency of energy utilization than if thermal energy alone is employed. The combined effects of high thermal energy and photolytic effect of ultraviolet radiation allow dissociation of water vapor to take place at a greater rate than if thermal energy alone is employed.

The mechanism through which this combined reaction takes place is believed to be as follows:

First, a portion of the concentrated incoming radiant energy (sunlight) primarily the infra-red frequencies (wave-lengths of approximately $10^4$ to $10^6$ angstroms) is converted to thermal energy (heat) upon contact with water vapor. This thermal energy is then absorbed by the molecules of the water vapor, agitating (heating) the water molecules and gradually increasing the frequency level of molecular vibrations to the level required for rupture of the molecular bonds and dissociation of the water molecules into their components. It is known that the level of thermal energy required for this molecular dissociation is extremely high, in excess of 3000° K. at standard pressure.

Second, radiant wave form energy in the form of concentrated sunlight directly bombards the agitated molecular bonds of the water vapor molecules and the near ultra-violet wave lengths (approximately $10^2$ to $10^3$ angstroms) of the light spectrum directly excite the vibrational level of the molecular bonds resulting in the dissociation of the water molecules into atoms molecules and ions of hydrogen (H+, $H_2$) and oxygen (O, $O_2$), and hydroxyl radicals (OH). Thus, the near ultra-violet wave frequencies of the natural light spectrum can supply additional energy for breaking the molecular bonds in water vapor. Therefore, concentrated ultra-violet energy in combination with high levels of thermal energy can allow given rate of direct dissociation of the molecules of water vapor to take place at lower thermal energy levels and with greater energy utilization efficiencies than if thermal energy alone is employed. Conversely, at given level of thermal energy dissociation of water vapor molecules will proceed at a greater rate.

The present invention takes full advantage of both the thermal and photolytic properties of solar energy (sunlight).

Thus, this invention has significant advantages over other solar energy devises.

Direct dissociation of water molecules can take place at lower thermal energy levels and with greater energy utilization, thus smaller scale collection apparatus can be employed with equivalent results, with an attendant lower capital investment.

Known devices transmit thermal energy to the water indirectly through the wall of a metallic container, which causes substantial energy losses due to the conduction transfer through the container.

The concentrated solar energy initially impacts the container wall of previously known devices directly at the extremely high temperature levels required to (a) overcome energy transfer losses and (b) sustain the extremely high internal temperatures required for direct thermal dissociation. This requires that the container be constructed of materials capable of withstanding these extremely high temperature concentrations and the rapid upward and downward temperature excursions caused by abrupt fluctuations in the level of available sunlight over extended periods without undergoing catastrophic failure, e.g., by fusion, thermal shock, fracture, corrosion, embrittlement, etc. Suitable materials such as tungsten not only are very expensive, but also are very difficult to machine and manufacture.

In order to properly utilize the aforesaid capabilities, it is necessary to track the sun on its daily path across the sky with specificity. The present invention is a system for tracking the sun through the use of both ultraviolet and infra-red sensors, each of which is located adjacent or in conjunction with the other at each point at which a sensor is located. Focusing tubes are suitably for employment in my invention, but any currently available optic can be substituted for them. Prior art solar trackers such as that shown in Chromie U.S. Pat. No. 4,198,826, utilize shadow plates, which avoid direct impingement of light onto its detectors.

OBJECTS OF THE INVENTION

Accordingly, it is the principle object of this invention to provide a means for tracking the sun on it daily path across the sky.

It is another object to provide a means for correcting the tracking mechanism whenever there is no direct sunlight.

It is a further object to provide a method and apparatus sensing the presence of sunlight, and to utilize it in generating hydrogen and oxygen using solar energy.

SUMMARY OF THE INVENTION

The present invention is an automatic tracking system for tracking the sun on its path across the sky, which utilizes the benefits of both infrared and ultra-violet sensors for sensing the presence of sunlight. The system includes a reflector, a pre-programmed, automatic timed drive mechanism connected to the reflector for driving the reflector along a given path, both ultraviolet and infrared sensors positioned at each of four points spaced equidistant around the rim of the reflector, means for comparing the amount of light detected by each opposing pair of sensors, and means responsive to the comparing means for tilting the reflector about a horizontal and a vertical axis until the amount of light detected by each pair of sensors is equalized. An alternative embodiment utilizes a single central detector having opposed pairs of sensors within itself. The comparing means is a programmable logic controller.

BRIEF DESCRIPTION OF THE DRAWINGS

This invention is better understood by referring to the following detailed specification and the appended drawings in which.

DETAILED DESCRIPTION

Figure 1:
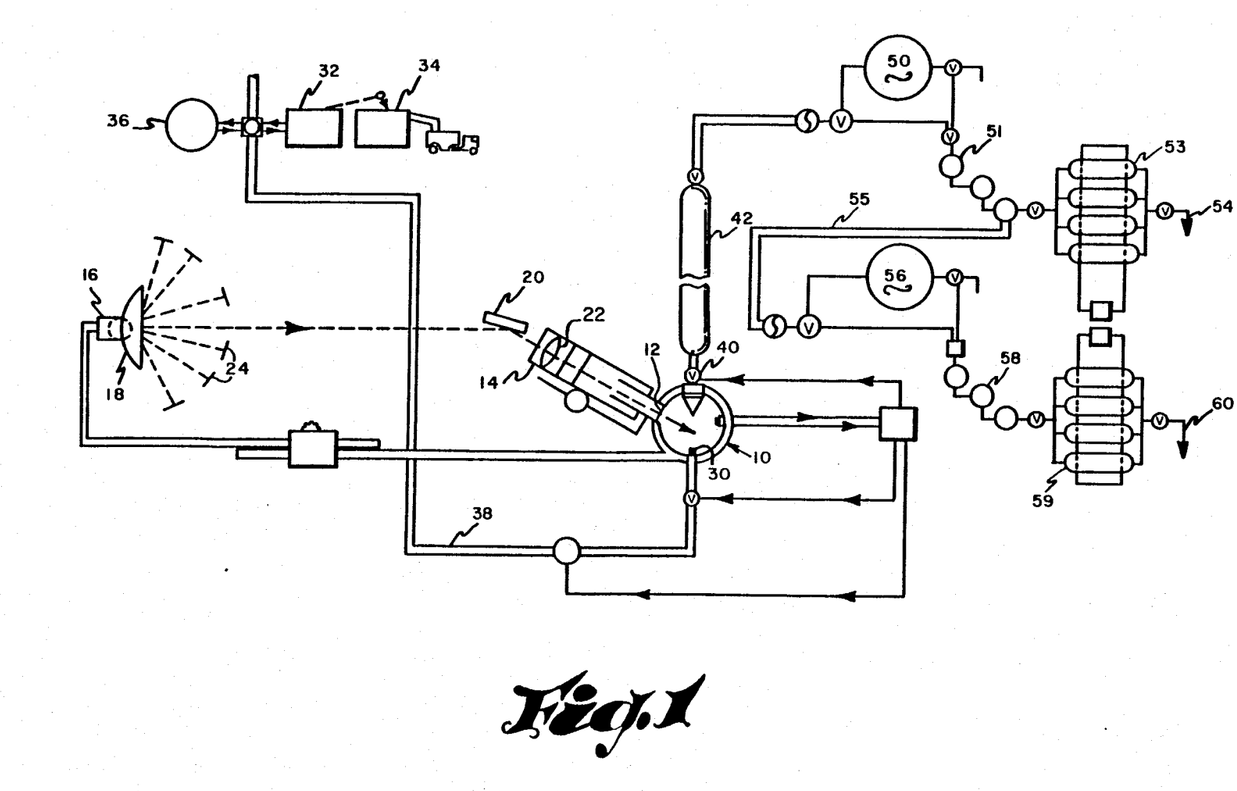
FIG. 1 illustrates schematically one embodiment of this invention in the production of hydrogen using solar energy.

Referring now to FIG. 1, a reaction chamber 10 is a sealed vessel lined with high temperature ceramic and-/or reflective material. Mounted in the wall of the reaction chamber is a transparent focusing lens 12 which also acts as a vapor barrier. A movable focusing lens tube 14 external to the chamber is directed towards the lens 12. An automatic tracking drive mechanism 16 is connected to a 2-axis 360° tracking parabolic reflector 18, which collects the sun's rays and reflect them against an optional mirror 20, which directs the rays through optional collector lens 22 and focusing lens 20. Secondary reflector 18 and increase the intensity of the rays of solar energy collected. Water is injected into the bottom of reaction chamber 10 through an injector head 30. The water is preferably demineralized by ion exchange in a standard demineralizing apparatus 32, and the minerals are recovered at 34 as an additional by-product of this process. Cleaned, demineralized (chlorine-free) water of potable grade is stored in holding tanks 36 until pumped through line 38 to the water injector head 30. The temperature in the reaction vessel 10 is raised to at least 4500° F. by directing concentrated solar energy therein. The optimum dissociation temperature of water is in the range of 5000° to 7500° F. However, the dissociation reaction begins at a temperature of about 4500° F.

The dissociated hydrogen and oxygen and other by-products in the gaseous state are released from the reaction chamber through a servo pressure valve 40 into a gas collecting tank 42 which is associated with a gas separating means such as a separator tank or a permeable membrane separating unit. The mixed dissociated gases may be separated by one of several techniques such as compression or refrigeration in series connected compressors or refrigeration units 51 and the resulting liquid oxygen is stored in tanks 53 such as Dewar flasks, the low temperature of which is maintained by a compression-liquefaction and repressurization system.

The remaining unseparated gas is circulated through line 55 from where it may be stored in tank 56 for future use, or it may be refrigerated or compressed in units 58 to liquid hydrogen and stored in tanks 59 such as Dewar flasks from which liquid hydrogen may later be withdrawn at 60.

Figure 2:
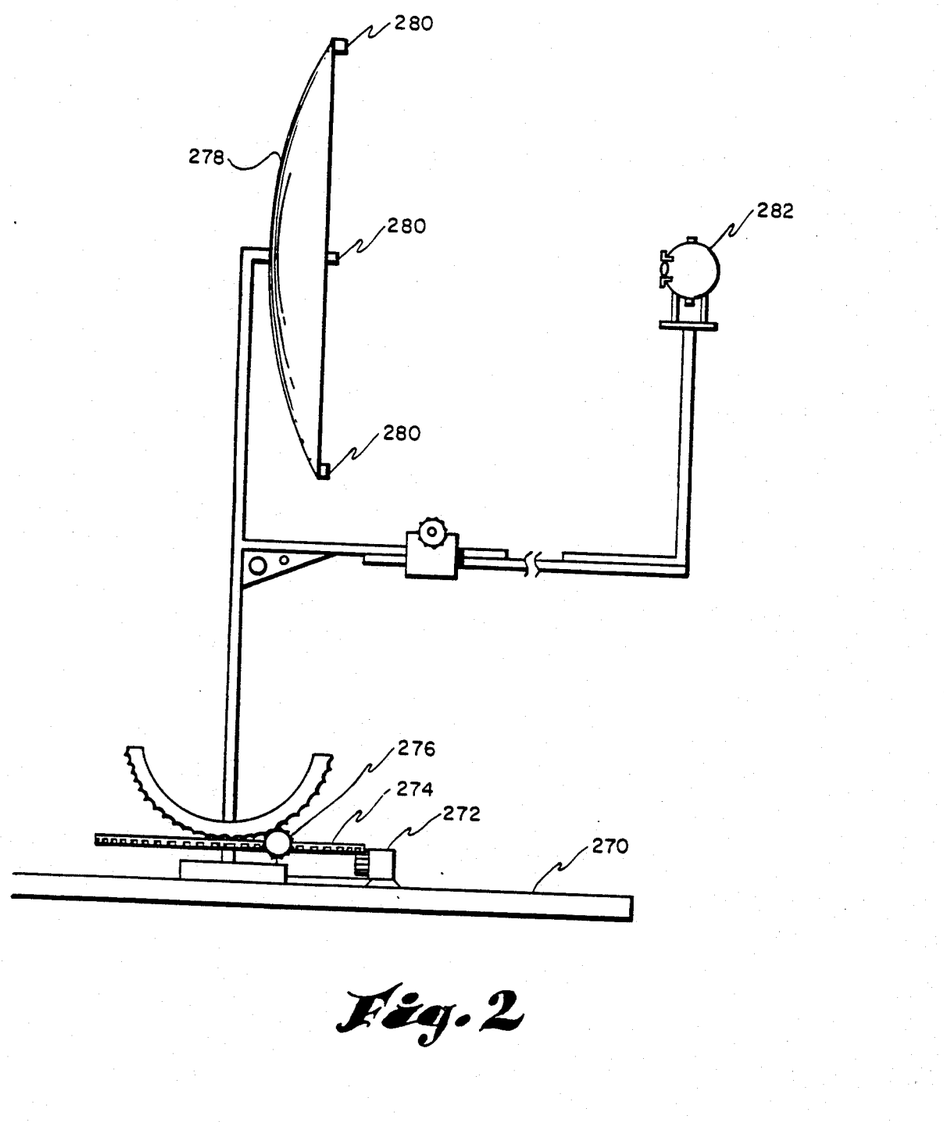
FIG. 2 is a side elevation view of a tracking reflector showing the relative location of a reaction chamber and associated drive mechanisms.

The tracking mechanism employed includes two systems. The first system, shown in FIG. 2, is an automatic timer controlled tracking mechanism programmed to follow the path of the sun across the sky. The timer controls a two-axis drive mechanism mounted on the base plate 270 of the reflector-dissociator mounting base and synchronizes the direction and rate of movement of the axis of the parabolic reflector with the center point of the sun's images as it traverses its path through the sky each day.

Drive 272 engages horizontal rotation gear 274 for tracking the sun from dawn to dusk through an angle of about 180 degrees. If desired, this drive could move the mechanism through 360 degrees merely by making gear 274 round. Tilting drive mechanism 276 comprises a ring and pinion gear or any other suitable drive means to tilt the parabolic reflector 278 through any desired angle up to approximately 170 degrees.

This automatic timer controlled tracking mechanism is similar to those devices used to control the movement of astronomers' telescopes in tracking a given star in its nightly path through the sky and is programmed daily using known data regarding the sun's path through the sky for each day of the calendar year, from a given latitude and longitude. This programmable timer control unit can be located either on the base of the mounting mechanism or within the programmable control unit or both.

The second tracking system includes infra-red and ultraviolet sensors 280 mounted at the perimeter of each of the four quadrants of the parabolic reflector. The function of these sensors is to provide input signals to the programmable control logic unit to enable the computer logic to fine tune or trim the alignment of the reflector as it follows the path of the sun across the sky. This optimizes the amount of usable sunlight that reaches the reflector 278 and subsequently the reaction chamber 282. The reflector alignment is automatically balanced through servo-drive mechanism until the signals generated by the ultra-violet and infra-red sensors 280 at each of the four points around the rim of the reflector 278 are equalized and optimized at the level of greatest available solar energy input to the reflector.

Figure 3:
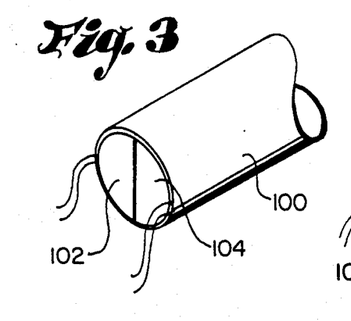
FIGS. 3, 4, 5, 6 and 7 illustriate various alternative detector arrangements.

Suitable optics for the detectors located at 280 would be a focusing tube with an ultraviolet and infrared sensor located within it. FIG. 3 shows a focusing tube 100, open at its upper end. The base of the focusing tube contains an ultraviolet sensor 102 and an infrared sensor 104, each of which have appropriate electrical connections or leads connecting them with a programmable logic controller.

Figures 4, 5:
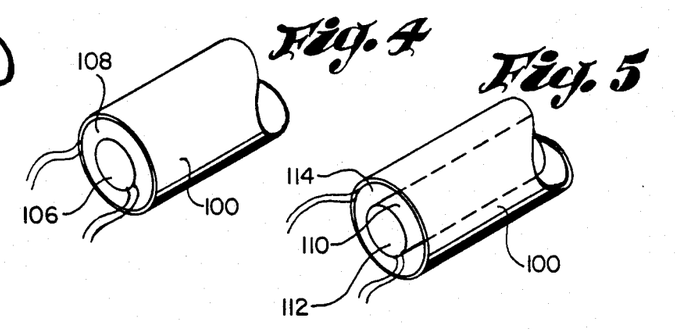

FIG. 4 shows a similar focusing tube 100 with an ultraviolet sensor 106 within an annular infrared sensor 108.

FIG. 5 shows a focusing tube 100 with a second coaxial central focusing tube 110 within it. An ultraviolet sensor 112 is positioned at the bottom of central focusing tube 110, and an infrared sensor 114 is positioned in the annular space between focusing tube 100 and tube 110.

Figure 6:
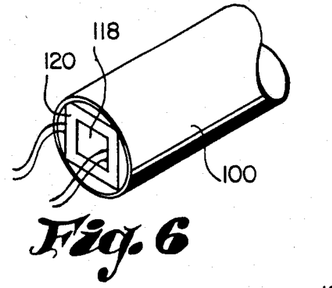

FIG. 6 shows a square or retangular patch infrared sensor 118 surrounding ultraviolet sensor 120, which has the same configuration as sensor 118, but is smaller and centered within the infrared sensor.

Figure 7:
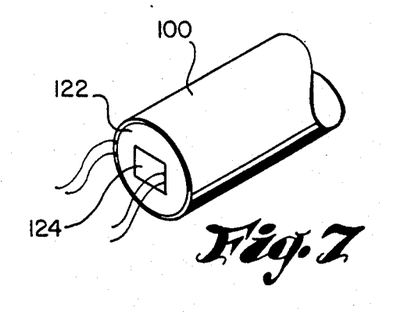

FIG. 7 shows a similar arrangement wherein the infrared sensor is circular and covers all of the bottom of the focusing tube not covered by the square ultraviolet sensor 124.

It is clear that any sensor arrangement can be utilized within a focusing tube, since four sets of quadrant sensors will be located around the collector. Many other suitable sensor arrangements could be utilized.

The programmable logic for this infra-red tracking system has the capacity to override the control of the timer controlled tracking mechanism in circumstances where a wide divergence exists between the input signals of the two systems, e.g. when the sun's rays become temporarily obscured by a cloud, or the amount of available solar energy suddenly becomes greater at some point in the sky other than the center point of the sun's image, as when a hole appears in the clouds, or at some other point where the intensity of the background sunlight or "skylight" is temporarily greater than at the primary source. It is one of the functions of the infra-red and ultra-violet sensor system to detect this divergence and realign the reflector and heliostats accordingly. When the cloud cover condition returns to normal clear sky condition, the divergence in signals from the two systems will disappear and allow the alignment of the reflector to return to the control of the automatic timer driver mechanism.

Figures 8, 9, 25:
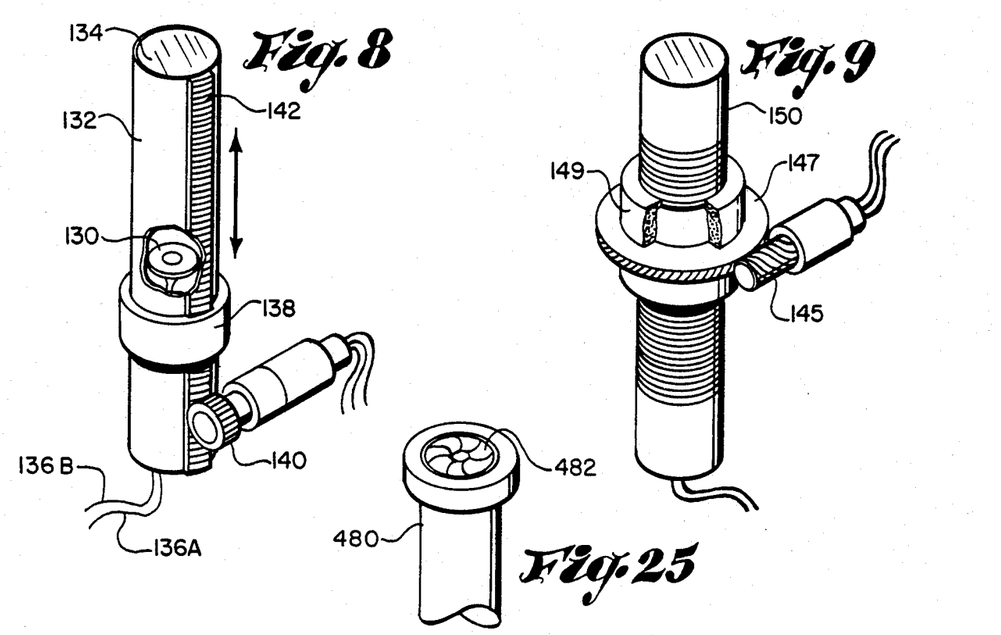
FIG. 8 is a partially broken away isometric view of a focusing tube and detector arrangement showing an adjustable length focusing tube.
FIG. 9 is an alternative focusing tube arrangement.
FIG. 25 is an isometric view of an alternative focusing tube.

FIG. 8 depicts an arrangement of a focusing tube wherein a detector 130 is situated at the bottom of focusing tube 132. A quartz, ultraviolet transmitting glass, or fluorspar, lens cover 134 may be provided at the top of the focusing tube for weather protection. The detector 130 is fixed in its position on a mounting bracket. Lead wires 136 A and 136 B connect the detector with a programmable logic controller (not shown). The focusing tube moves in a fixed guide bushing 138 by drive gear 140 meshing with rack 142 on the side of the focusing tube. Alternatively, the focusing tube could be mounted as shown in FIG. 9 wherein a worm drive 145 rotates gear 147 within fixed holding collar 149 and thus moves the threaded focusing tube 150 up or down in relation to the detector, which is mounted at a fixed location with regard to the gear 147.

A single central detector arrangement could also be utilized.

Figures 19, 24:
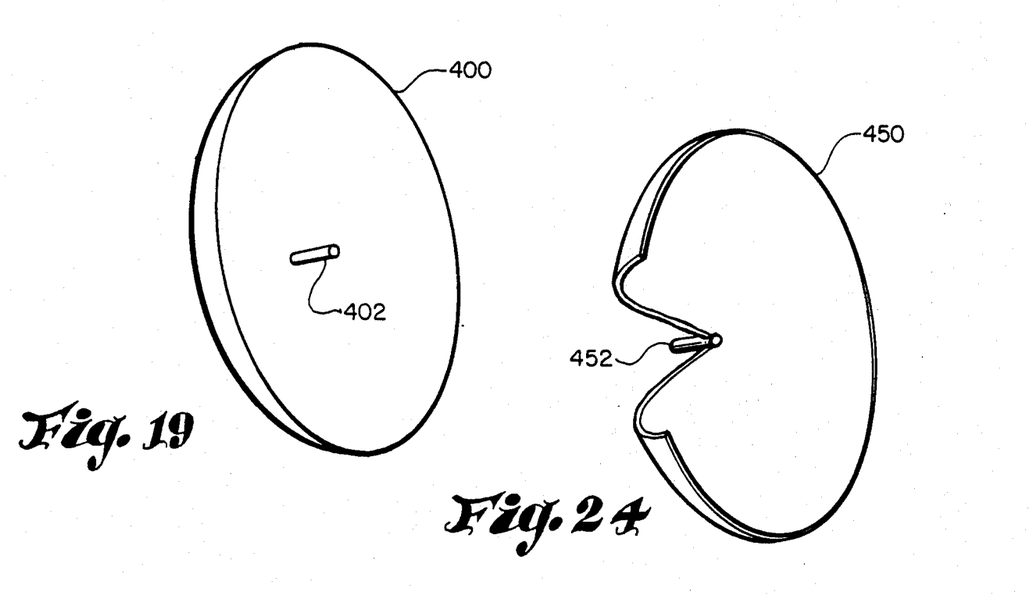
FIG. 19 is an elevational view of a solar collector having a single central detector.
FIG. 24 is an elevational view of a collector having a recessed detector.
Figure 20:
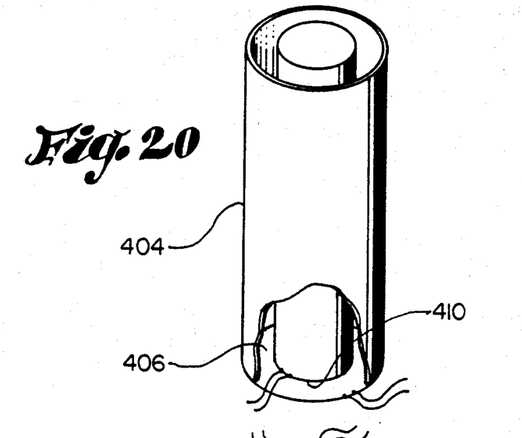
FIG. 20 is a detailed view of the detector of FIG. 19.
Figure 21:
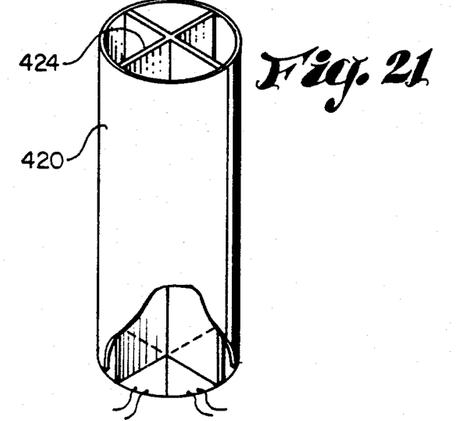
FIG. 21 is a collector showing an alternative detector.
Figure 22:
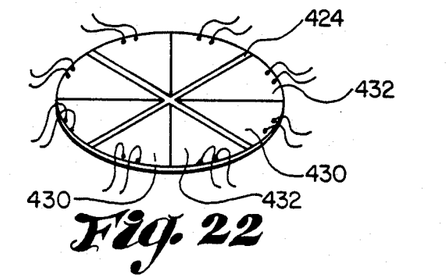
FIGS. 22 and 23 show the detector arrangements for use in the collector arrangement of FIG. 21.
Figure 23:
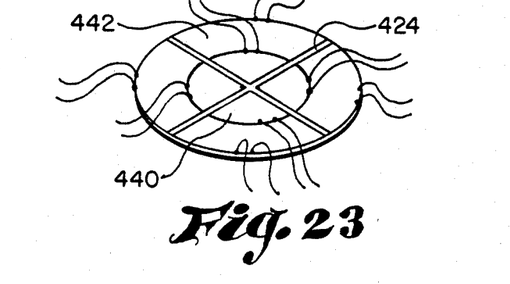

FIG. 19 shows a collector having a single central detector 402. Collector 400 can be substituted for collector 278 of FIG. 2. In this case detector 402 could have the configuration shown in FIG. 20, wherein a focusing tube 404 has an infrared detector at its lower end, and a central focusing tube 408 within tube 404 has an ultraviolet detector 410 at its bottom. Alternatively, a central detector arrangement could be utilized, as shown in FIG. 21, wherein focusing tube 420 is segmented by radial dividers 424. The dividers form four equal quadrants, the bottom of which contain both ultraviolet and infrared sensors. These sensors can have the configuration shown in FIG. 22, wherein equivalent sized infrared sensors 430 and ultraviolet sensors 432 are present in each quadrant, and alternating, or the sensors could have the configuration of FIG. 23 wherein the ultraviolet detectors 440 lie central to annular infrared detectors 442.

In another alternative embodiment, shown in FIG. 24, collector 450 has a recessed central detector 452, which contains both infrared and ultraviolet sensors. Detector 452 can have any sensor arrangement suitable for a single central detector, including those shown in FIGS. 22, and 23.

FIG. 25 shows a focusing tube 480 provided with a shutter 482 similar to a camera shutter to reduce or control the amount of sunlight allowed into the interior of the focusing tube. This will provide a more accurate control of the tracking procedure.

The infra-red and ultra-violet sensor systems also assist a programmable logic controller (PLC) in performing the vital function of controlling the rate of the dissociation reaction within the reaction chamber according to the available solar energy. When the level of available solar energy begins to decrease, infra-red and ultra-violet sensors and temperature sensors within the reaction chamber as well as those mounted on the parabolic reflector and heliostats sense this deviation and relay the information to the programmable logic control unit which in turn regulates servo-mechanism that controls the water injection valve and effluent pressure release valve in the reaction chamber. The water injection valve is partially closed and/or the pressure release valve opened thereby reducing the reactant flow rate through the reaction chamber. Accordingly, when the available sunlight drops below the minimum level required to sustain the dissociation reaction, the servo control system will automatically shut down the operation of the reaction chamber until sunlight conditions return to normal operating levels. Conversely, when the level of available solar energy begins to escalate, the sensory control logic automatically adjusts the flow rate through the reaction chamber accordingly, to optimize the dissociation rate.

The reaction chamber contains temperature and pressure sensors (not shown) which monitor conditions within the reaction chamber and feed back the control data to the programmable logic control unit.

It is the primary function of the PLC process control unit to control and coordinate the operation of the entire system in order to maintain "steady system" operating conditions, including temperature, pressure, and flow rate within the reaction chamber under sometimes varying environmental conditions. This is accomplished by controlling the water injection rate, and the incoming solar energy level, through the various injection and release valves, cooling-preheater system valves, and also by adjusting the sunlight tracking, collecting, and focusing mechanisms. In order to control and optimize the reaction rate and flow rate, and to maintain steady state operating temperature and pressure within the reaction chamber, the programmable logic process control unit relies on sensor input data from the various temperature, pressure, flow rate, infra-red, ultra-violet, hydrogen and oxygen sensors, as well as pre-programmed operating data on temperature and pressure control limits, solar tracking data, hydrogen and oxygen product levels, and required solar energy levels. The programmable process control logic unit is therefore the command control unit for all of the various sensor and servo systems that control the operation of the dissociating mechanism.

The heliostat field is also controllable about multiple axes, preferably about a horizontal and a vertical axis. The movements of the heliostats are controlled and coordinated by the programmable logic control unit to track, collect and reflect the rays of the sun onto the parabolic reflector.

Numerous alternative deployment arrangements have been conceived and are illustrated in FIGS. 10 through 18. But despite the deployment arrangement utilized, the basic function of the heliostat field always remains the same: that is, to track, collect, reflect, and focus additional available solar energy onto the parabolic reflector. The alignment of the heliostats can also be automatically adjusted by the programmable logic control unit to vary the intensity of the solar energy input to the parabolic reflector in order to regulate energy input to the reaction chamber.

Figure 10:
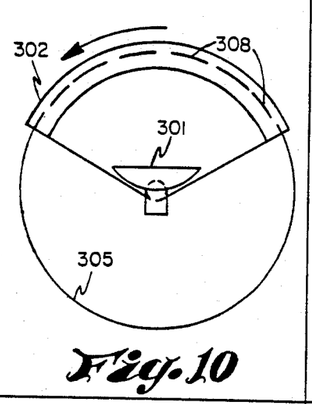
FIGS. 10, 11, 12, 13, 14, 15, 16 and 17 are plan views of various arrangements of solar energy collectors wherein heliostats are arranged about a parabolic reflector.
Figure 11:
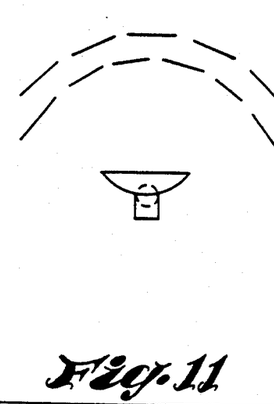
Figure 12:
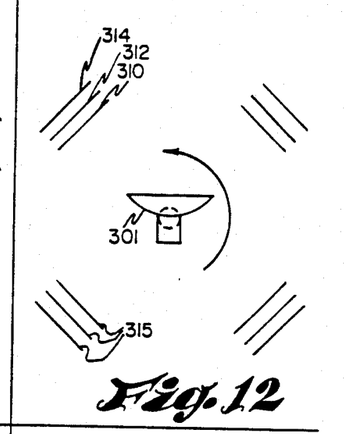
Figure 13:
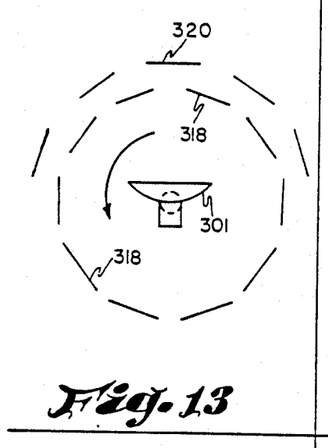
Figure 14:
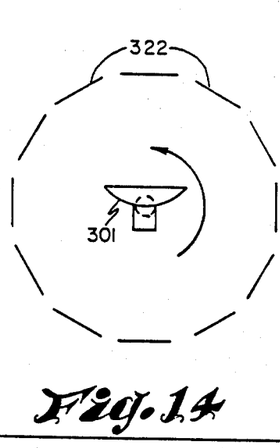
Figure 15:
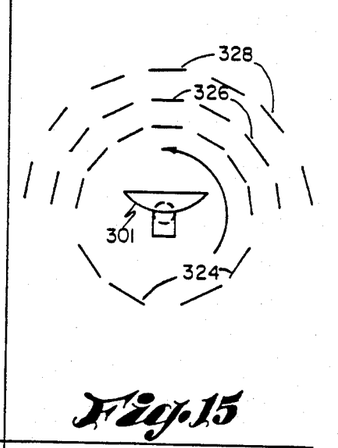
Figure 16:
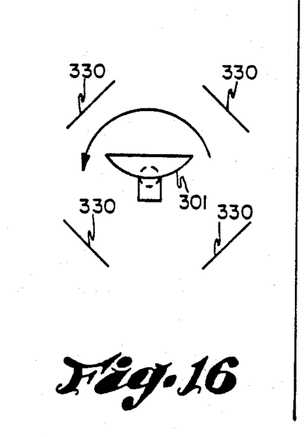
Figure 17:
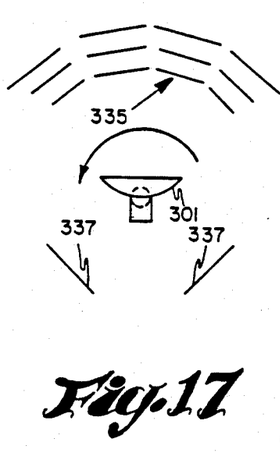

FIG. 10 shows a parabolic reflector 301 connected to a track mounted heliostat base 302 which rides on circular track 305. Any desired number of heliostats 308 are mounted on base 302 for reflecting the sun's rays against the parabolic reflector 310. Although the alternative embodiments shown in FIGS. 11 through 18 are not indicated as track mounted, such a track mounting may be employed in each embodiment if desired. FIG. 11 shows dual rows of heliostats, staggered both horizontally and vertically. In FIG. 12, heliostats 310 is at a low elevation, heliostat 312 is slightly higher and heliostat 314 is highest. All three heliostats reflect solar rays into parabolic reflector 301. The back reflectors 315 pick up rays that miss the parabolic reflector 301 or they can be employed to collect solar rays at different times of day. FIG. 13 shows parabolic reflector 301 completely surrounded by heliostats 318 which are backed at least partially by a second row of staggered heliostats 320. FIG. 14 shows a rotational parabolic reflector 301 surrounded by heliostats 322. The parabolic reflector 301 of FIG. 15 is surrounded by heliostats 324 which are in part backed by a row of elevated heliostats 326 and a second row of elevated heliostats 328 all of which are symmetrically arranged. The parabolic reflector of FIG. 16 is associated with only the basic four quadrant heliostats 330. FIG. 17 shows a heliostat arrangement whereby symmetrically arranged rows of heliostats 335 face parabolic reflector 301 which is backed by heliostats 337.

Figure 18:
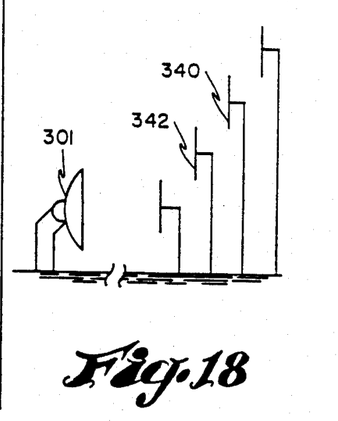
FIG. 18 is a side elevational view of a heliostat arrangement for directing solar energy into a parabolic reflector.

FIG. 18 is a side elevational view of a heliostat arrangement in which each succeeding row of heliostats such as row 340 is at a higher elevation than the preceeding row 342. There is no limit to the number of rows of heliostats that can be employed. The heliostats must be inclined at a proper angle to reflect the solar rays accurately into reflector 301.

Figure 26:
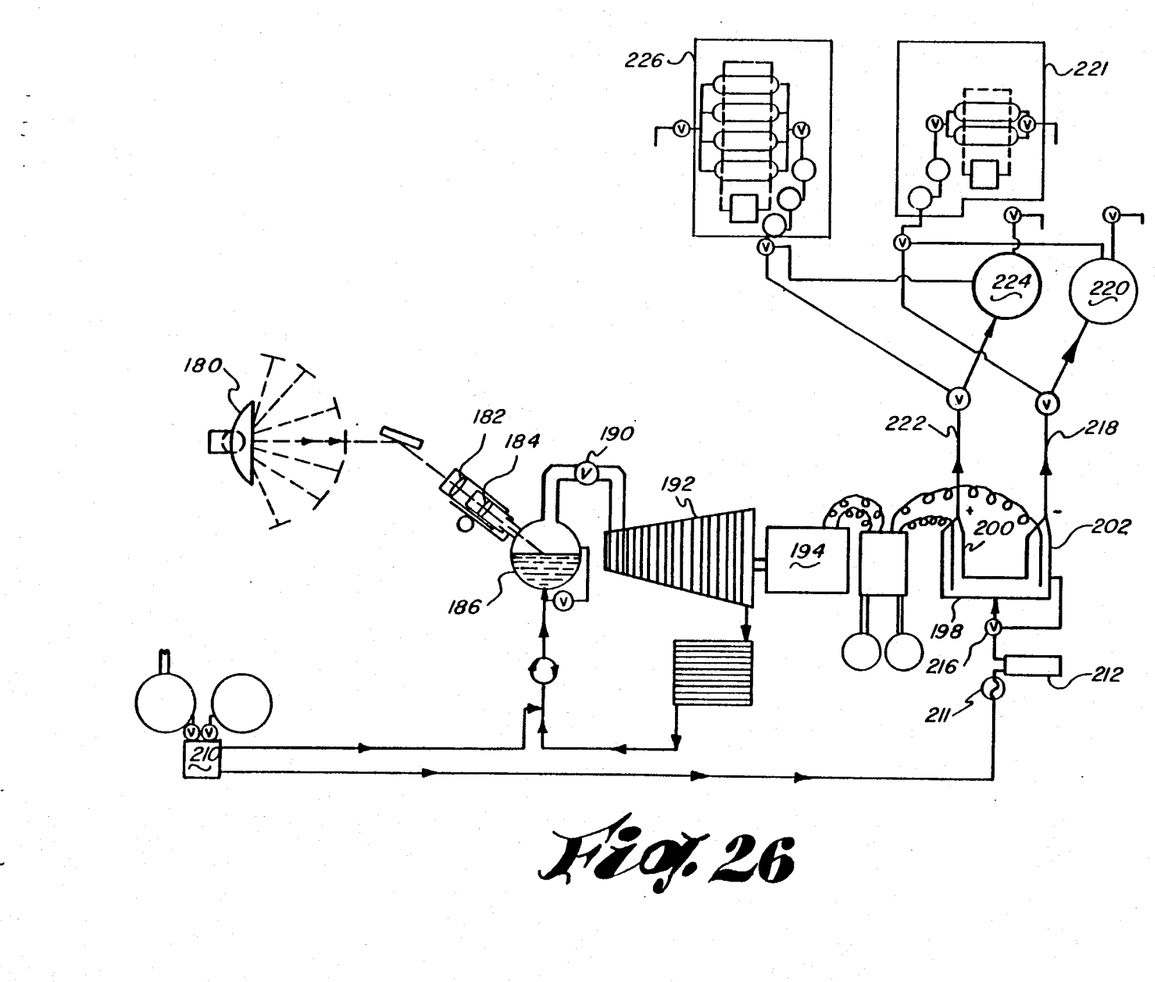
FIG. 26 illustrates schematically an alternative method for producing hydrogen through the use of this invention.

FIG. 26 shows an alternative embodiment of this process wherein solar energy is utilized to heat water in a boiler to a sufficient temperature to operate a steam turbine, which in turn runs a generator. The power generates operates as electrolytic cell in which hydrogen and oxygen are formed from water. Referring now to FIG. 26, a parabolic reflector 180 directs solar energy through a collector lens 182 and a focusing lens 184 into a water-containing boiler 186. The temperature in the boiler is sufficiently high that water entering it will flash to steam, which will then pass through turbine throttle valve 190 into steam turbine 192, driving associated generator 194.

The electrical output of generator 194 provides the electrical input to an electrolytic dissociator 198, having a anode 200 and a cathode 202. Fresh demineralized water from supply 210 is fed through pump 211 to a mixing station 212 wherein the water is mixed with dilute solution of $H_2SO_4$ or other electrolyte to form an electrolyte solution. The electrolyte solution is introduced to electrolytic dissociator 198, such as a U-tube, the water level of which is kept constant by a level control 216. Elemental hydrogen is formed at the cathode 202 and is removed through line 218. It may be stored in the gaseous form in pressure vessel 220, or it may be refrigerated to liquid hydrogen in unit 221. Gaseous oxygen is removed through line 222 from the anode 200 and it likewise may be stored in gaseous form in tank 224, or it may be liquified in refrigeration unit 226. Alternatively, hydrogen may be combined as a metallic hydride and stored in this form for later use.

It can readily be seen from the foregoing that this invention provides an automatic tracking system for tracking the sun on its daily path across the sky.

While the preferred embodiments of the invention have been shown and described, it will be understood that they are merely illustrative and that changes may be made without departing from the scope of the invention as claimed.

What is claimed is:

1. An automatic tracking system for tracking the sun on a path across the sky, comprising:
   a reflector;
   a pre-programmed, automatic timed drive mechanism connected to said reflector for driving said reflector on a given path, both ultraviolet and infrared sensors positioned on said reflector;
   means for comparing the amount of light detected by each opposing pair of sensors; and means responsive to said comparing means for tilting the reflector about a horizontal and a vertical axis until the amount of light detected by each pair of sensors is equalized.

2. Apparatus according to claim 1 wherein both ultraviolet and infrared sensors are positioned at each of four points spaced equidistant around the rim of said reflector.

3. Apparatus according to claim 1 wherein said comparing means is a programmable logic controller.

4. An automatic preprogrammed tracking system for tracking the sun on a given path across the sky, comprising:
(a) a reflector;
(b) programmable logic control unit;
(c) an automatic continuous timed drive mechanism connected to said reflector, whereby initial daily movements of said automatic continuous timed drive mechanism are initiated by said programmable logic control unit according to known preprogrammed ephemeris data regarding time and position of sun for each day of the year for a given latitude and longitude, and whereby movements of said reflector are controlled by said programmable logic control unit;
(d) both ultraviolet and infrared sensors positioned at one or more predetermined locations on said reflector;
(e) means for comparing the amount of light detected by each opposing pair of sensors;
(f) means connected to said sensors and to said comparing means for communicating output signals of each detector to said comparing means; and
(g) means responsive to said comparing means for tilting the reflector about a horizontal and vertical axis until the amount of light detected by each pair of sensors is equalized.

* * * * *